US012690742B2

(12) United States Patent
Vernazza

(10) Patent No.: US 12,690,742 B2
(45) Date of Patent: Jul. 28, 2026

(54) SQUEEGEE WITH SELECTABLE ROTATION MODE

(71) Applicant: IP CLEANING S.R.L., Portogruaro (IT)

(72) Inventor: Giulio Vernazza, Fontanellato (IT)

(73) Assignee: IP Cleaning S.R.L., Portogruaro (IT)

( * ) Notice: Subject to any disclaimer, the term of this patent is extended or adjusted under 35 U.S.C. 154(b) by 670 days.

(21) Appl. No.: 17/615,061

(22) PCT Filed: May 20, 2020

(86) PCT No.: PCT/IB2020/054790

§ 371 (c)(1),
(2) Date: Nov. 29, 2021

(87) PCT Pub. No.: WO2020/234803

PCT Pub. Date: Nov. 26, 2020

(65) Prior Publication Data

US 2022/0218173 A1 Jul. 14, 2022

(30) Foreign Application Priority Data

May 21, 2019 (IT) ........................ 102019000007069

(51) Int. Cl.
*A47L 13/11* (2006.01)
*A47L 1/06* (2006.01)
(Continued)

(52) U.S. Cl.
CPC ................. *A47L 13/11* (2013.01); *A47L 1/06* (2013.01); *A47L 13/42* (2013.01); *B25G 3/38* (2013.01)

(58) Field of Classification Search
CPC ... A47L 13/11; A47L 1/06; A47L 1/05; A47L 13/42; A47L 13/022; A47L 13/24;
(Continued)

(56) References Cited

U.S. PATENT DOCUMENTS 742,590 A * 10/1903 Cattelle ..................... A47L 1/06 403/92
1,579,941 A * 4/1926 Jenkins .................. A47L 13/11 15/245
(Continued)

FOREIGN PATENT DOCUMENTS

BE 1024299 A1 1/2018
BE 1024299 B1 * 1/2018
(Continued)

*Primary Examiner* — Monica S Carter
*Assistant Examiner* — Kent N Shum
(74) *Attorney, Agent, or Firm* — Volpe Koenig

(57) ABSTRACT

A cleaning device includes a handle, having a longitudinal axis, and a cleaning body, having a cleaning plane, arranged to contact and wipe a surface. The cleaning device also includes a first pivotal constraint arranged to allow a relative rotation between the handle and the cleaning body about a first rotation axis orthogonal to the cleaning plane and a second pivotal constraint arranged to allow a relative rotation between the handle and the cleaning body about a second rotation axis parallel to the cleaning plane. The cleaning device also includes a first selection mechanism arranged to make the first pivotal constraint to pass between a free rotation mode. The handle and the cleaning body can rotate freely to each other with respect to the first rotation axis, a locked rotation mode but cannot rotate to each other with respect to the first rotation axis and a constrained rotation mode.

9 Claims, 4 Drawing Sheets

(51) Int. Cl.
*A47L 13/42* (2006.01)
*B25G 3/38* (2006.01)

(58) Field of Classification Search
CPC ......... B25G 3/38; A46B 5/002; A46B 5/0045; A46B 5/0025; A46B 5/0029; A46B 5/0041; A46B 5/0054; A46B 5/0058; A46B 5/0075; A46B 5/0079; A46B 5/0083
USPC .................................................. 15/172, 144.1
See application file for complete search history.

(56) References Cited

U.S. PATENT DOCUMENTS

| | | | | |
|---|---|---|---|---|
| 4,847,938 A * | 7/1989 | Unger | A47L 1/06 15/245 |
| 2004/0040108 A1* | 3/2004 | Kaminstein | A46B 7/06 15/144.1 |
| 2011/0203065 A1 | 8/2011 | Simon | |

FOREIGN PATENT DOCUMENTS

| | | | |
|---|---|---|---|
| EP | 1872701 A1 * | 1/2008 | A47L 13/12 |
| WO | 2013164800 A1 | 11/2013 | |

* cited by examiner

SQUEEGEE WITH SELECTABLE ROTATION MODE

FIELD OF THE INVENTION

The present invention relates to the field of surface cleaning tools.

In particular, the invention relates to a squeegee with a joint capable of allowing different rotation modes.

BACKGROUND

Squeegee are known which comprise different rotation mechanisms between the handle and the cleaning blade, in order to facilitate the use and adapt the position of the cleaning blade to different phases of cleaning a glass or other similar surface.

In addition to allow the blocking of the cleaning blade according to a certain angle of rotation with respect to the handle, these rotation mechanisms can allow the operator to use the squeegee in the “swivel” mode, i.e. with a free rotation between the cleaning blade and the handle that allows to speed up the sweeping of the glass according to variable directions.

An example is shown in BE1024299, which describes a squeegee comprising a handle and a cleaning body rotatable around a first rotation axis, to work in “swivel” mode. Furthermore, the cleaning body can be locked in at least two positions.

However, this “swivel” mode can be difficult for an inexperienced user to use, as it can cause the blade to jam when it is parallel to the handle, greatly slowing down the cleaning operation.

There are known mechanisms in the prior art which allow to constrain this rotation not to exceed 90°. However, these systems, unlike those mentioned above, do not allow the blade to be placed parallel to the handle, an essential position for cleaning at a great distance from the operator.

Furthermore, there is a need for a system that allows you to choose the blade rotation mode to adapt to the various cleaning phases.

SUMMARY

It is therefore a feature of the present invention to provide a cleaning device surfaces which allows to choose the mode of rotation of the blade to adapt to the various cleaning phases, even in the case of use by a non-expert user.

These and other objects are achieved by a cleaning device according to the appended claims.

BRIEF DESCRIPTION OF THE DRAWINGS

Further characteristic and/or advantages of the present invention are illustrated by the following description of an exemplary embodiment thereof, exemplifying but not limitative, with reference to the attached drawings in which.

DETAILED DESCRIPTION OF THE PREFERRED EMBODIMENTS

Figure 1A:
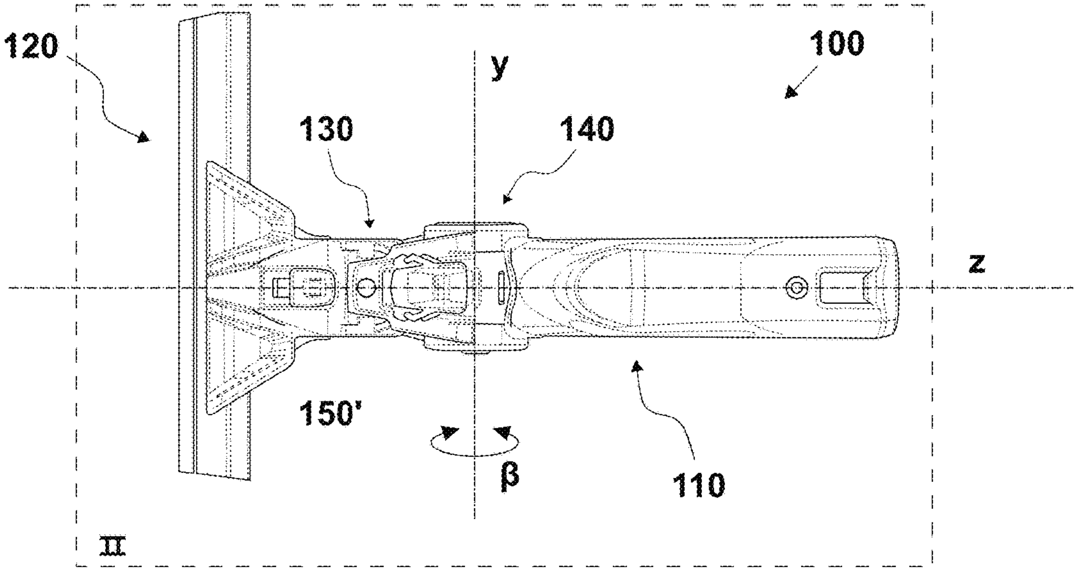
FIG. 1A shows, in top view, an exemplary embodiment of the cleaning device according to the present invention.
Figure 1B:
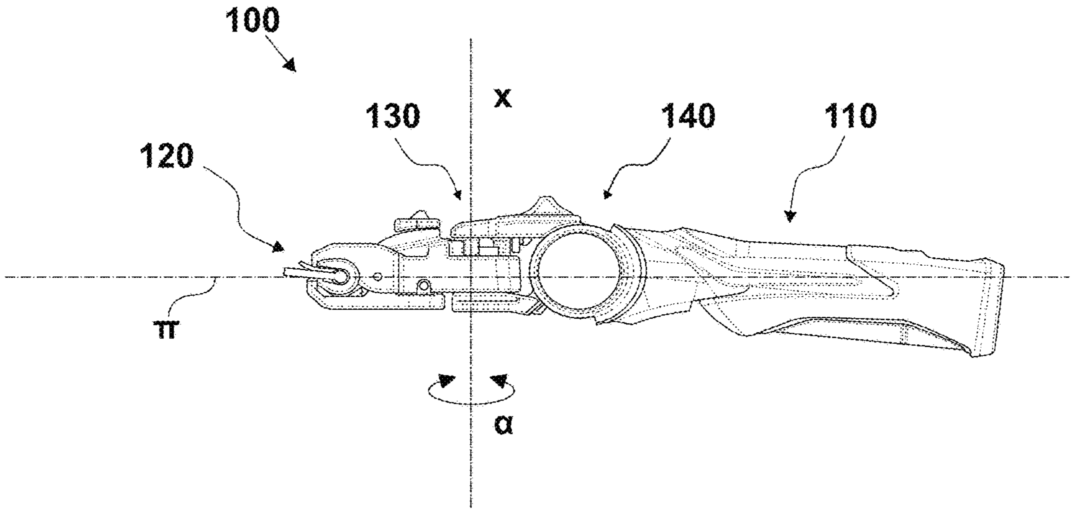
FIG. 1B shows, in side view, the cleaning device FIG. 1A.

With reference to FIGS. 1A and 1B, the cleaning device 100 comprises a handle 110, for the grip of the cleaning device 100 by a user, and a cleaning body 120 comprising a blade arranged to wipe a surface, in particular a glass.

The cleaning device 100 also comprises a first pivotal constraint 130 arranged to allow a relative rotation $\alpha$ between the handle 110 and the cleaning body 120 about a first rotation axis x orthogonal to the cleaning plane $\pi$ defined by the cleaning body 120.

The cleaning device 100 comprises then a second pivotal constraint 140 arranged to allow a relative rotation ß between the handle 110 and the cleaning body 120 about a second rotation axis y parallel to the cleaning plane $\pi$.

Figure 2A:
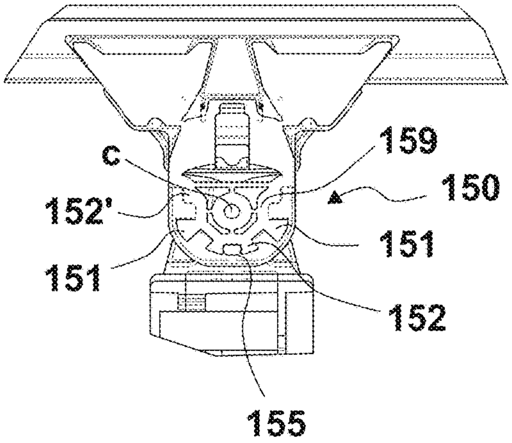
FIG. 2A shows, in detail, a possible exemplary embodiment of the first selection mechanism when the first pivotal constraint is in the locked rotation mode.
Figure 2B:
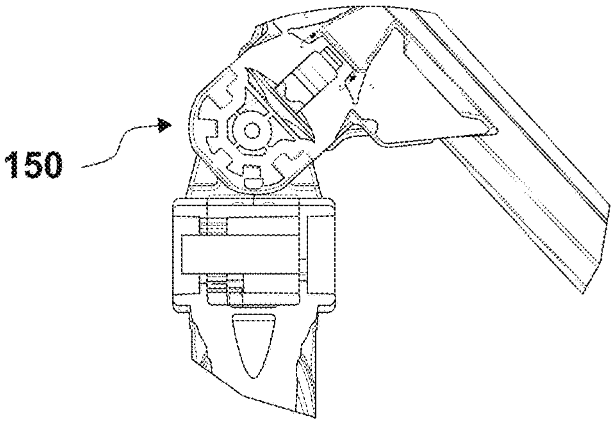
FIG. 2B shows an exemplary embodiment of the first selection mechanism of FIG. 1A when the first pivotal constraint is in the constrained rotation mode.
Figure 2C:
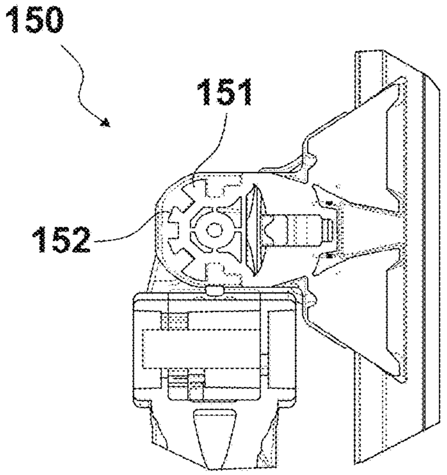
FIG. 2C shows an exemplary embodiment of the first selection mechanism of FIG. 1A when the first pivotal constraint is in the free rotation mode.

With reference even at FIGS. 2A, 2B and 2C, the cleaning device 100 comprises then a first selection mechanism 150 arranged to make the first pivotal constraint 130 to switch between:

- a free rotation mode, where the handle 110 and the cleaning body 120 can rotate freely to each other with respect to the first rotation axis x [FIG. 2C];
- a locked rotation mode, wherein said handle 110 and said cleaning body 120 cannot rotate to each other with respect to said first rotation axis x [FIG. 2A];
- a constrained rotation mode, where the relative rotation $\alpha$ has a maximum value equal to a predetermined value $\tilde{\alpha}$ [FIG. 2B].

Such value a can be for example of 90°.

The selection mechanism 150 can be operated by the user by the button 150', visible in FIG. 1A.

In particular, the selection mechanism 150 comprises a crown 159 that has at least two distant teeth 151 and two close teeth 152, and a selector 155. The selector 155 is adapted to carry out a relative translation, in particular in a radial direction with respect to the crown 159, to switch between 3 mode of rotation, due to the translation of the button 150'.

In particular, in FIG. 2A the selector 155 is in the position $P_2$ where the selector 155 is at a minimum distance $d_{min}$ with respect to the center c of the crown 159 and is blocked between two close teeth 152. This way, the first pivotal constraint 130 is in the locked rotation mode. Such mode can be used for blocking the relative rotation $\alpha$ at different relative angles between the handle 110 and the cleaning body 120, from the angle wherein handle 110 and cleaning body 120 are orthogonal to the angle wherein they are parallel to each other.

In FIG. 2B the selector 155 is in the position $P_3$ where the selector 155 is at an intermediate distance $d_{med}$ with respect to the center c of the crown 159 and, during the relative rotation α, can meet only the two distant teeth 151. This way, the first pivotal constraint 130 is in the constrained rotation mode.

In this mode it is possible to use the cleaning device 100 in the "swivel" mode preventing the jamming of the blade of the cleaning body 120 even by an inexperienced operator.

In FIG. 2C the selector 155 is in the position $P_1$ where the selector 155 is at a maximum distance $d_{max}$ with respect to the center c of the crown 159 and, during the relative rotation α, cannot meet neither a distant tooth 151 nor a close tooth 152. This way, the first pivotal constraint 130 is in the free rotation mode.

Figure 3A:
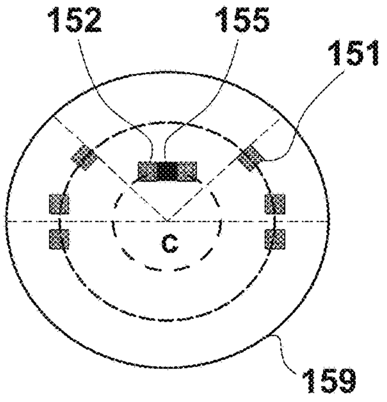
FIGS. 3A, 3B and 3C schematically show a possible exemplary embodiment of the first selection mechanism with the crown and the selector, respectively, in the relative positions $P_1$, $P_2$ and $P_3$.
Figure 3B:
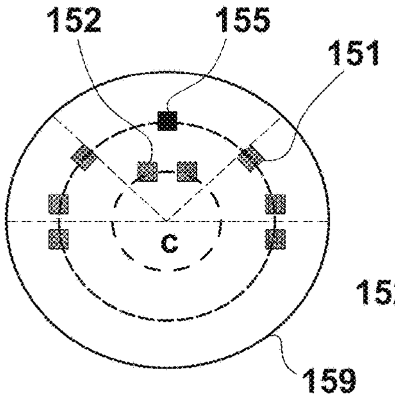
Figure 3C:
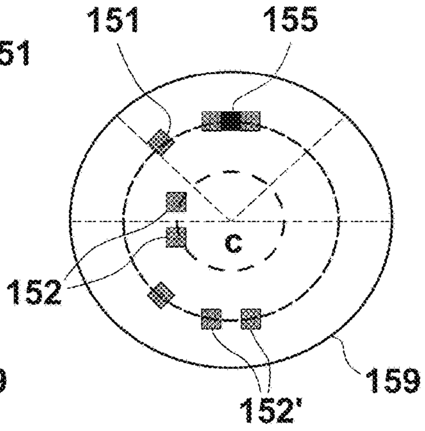

This mode, in addition to allow use the cleaning device 100 in the "swivel" mode, allows the user to switch between the constrained mode and the blocked mode, or to block the rotation at different angles between the handle 110 and the cleaning body 120; FIGS. 3A, 3B and 3C schematically show the operation of a possible exemplary embodiment of the selection mechanism 150 similar to that of FIGS. 2A, 2B and 2C.

In particular, in FIG. 3A the first pivotal constraint 130 is in the locked rotation mode with the selector 155 blocked between the internal close teeth 152 and, therefore, with the handle 110 and the cleaning body orthogonal to each other.

In FIG. 3B the first pivotal constraint 130 is in the constrained rotation mode with the selector 155 free to slide between the distant teeth 151 during the relative rotation α.

In FIG. 3C the first pivotal constraint 130 is in the locked rotation mode with the selector 155 blocked between the external close teeth 152' and, therefore, with the handle 110 and the cleaning body parallel to each other.

Figure 4A:
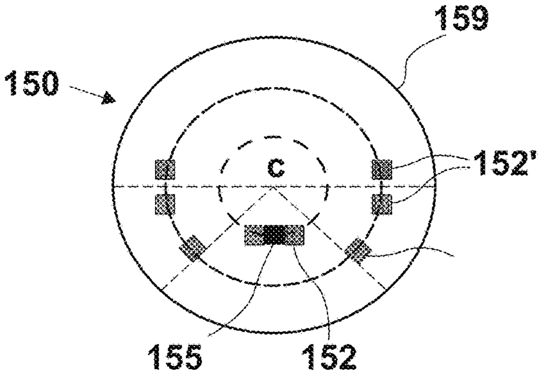
FIGS. 4A and 4B show, respectively in top and front view, a possible alternative of the first selection mechanism.
Figure 4B:
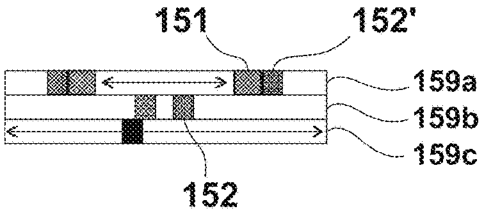
Figure 5:
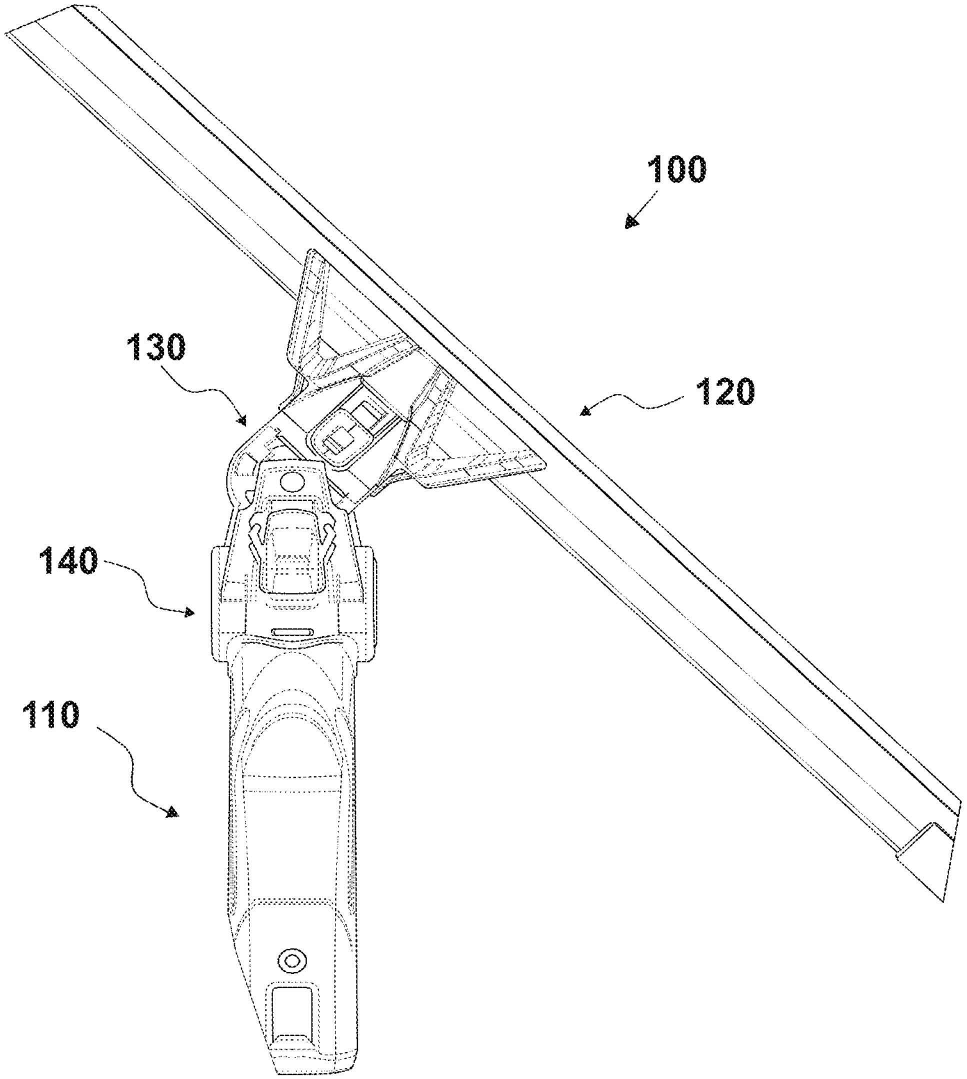
FIG. 5 shows an exemplary embodiment of the cleaning device of FIGS. 1A and 1B, in the constrained rotation mode.

In the FIGS. 4A and 4B it is shown a possible alternative of the first selection mechanism 150, wherein the crown 159 may have 3 planes 159*a*, 159*b* and 159*c* on which the teeth 151, 152 and 152' can be arranged in different possible combinations.

For example, the distant teeth 151 and the external close teeth 152' can be arranged in the plane 159*a*, whereas the close teeth inner 152 can be arranged in the plane 159*b*. This way, by making the selector 155 move axially, it is possible to move it between one plane and another, allowing the first pivotal constraint 130 to pass between the aforementioned rotation modes.

The plane 159*c*, not including teeth, can be used both for free rotation, and for making the selector 155 to pass between the position blocked between the internal close teeth 152 and that one blocked between the external close teeth 152'. Such plane 159*c* may also not be present.

Although not shown in the figure for simplicity, all the various embodiments which make use of teeth arranged on at least two planes of the crown 159 are covered by FIGS. 4A and 4B, allowing the selector 155 to move both in the axial and radial position with respect to the crown itself.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention, it is to be understood that the phraseology or terminology that is employed herein is for the purpose of description and not of limitation.

The invention claimed is:

1. A cleaning device comprising:

a handle graspable by a user and supporting a cleaning body arranged to wipe a surface, said handle comprising a longitudinal axis z, a distal end on which the cleaning body is supported, and a proximal end positioned opposite the distal end along the longitudinal axis z;

said cleaning body comprising a blade arranged to be in contact with said surface on a cleaning plane π, the cleaning plane π passing through a distal end of the blade and through the distal end of the handle;

wherein the cleaning device further comprises:

a first pivotal constraint arranged to allow a relative rotation α between said handle and said cleaning body about a first rotation axis x orthogonal to said cleaning plane π;

a second pivotal constraint arranged to allow a relative rotation β between said handle and said cleaning body about a second rotation axis y parallel to said cleaning plane π;

a first selection mechanism configured to alternatively arrange said first pivotal constraint in a free rotation mode, wherein said handle and said cleaning body can rotate freely with respect to each other with respect to said first rotation axis x, and in a locked rotation mode, wherein said handle and said cleaning body cannot rotate with respect to each other with respect to said first rotation axis x; said first selection mechanism is also configured to arrange said first pivotal constraint in a constrained rotation mode, wherein said relative rotation α has a maximum value equal to a first predetermined value a in the free rotation mode and equal to a second predetermined value in the constrained rotation mode, the second predetermined value being smaller than the first predetermined value, wherein both said relative rotation α in the free rotation mode and said relative rotation α in the constrained rotation mode are symmetric with respect to said longitudinal axis z, the first selection mechanism comprising a selector and a crown that has a central notch and two first teeth symmetrical with respect to the central notch, and two second teeth symmetrical with respect to the central notch, the first teeth being closer to the central notch than the second teeth, the selector being adapted to carry out a translation with respect to the crown to switch between three different positions, a first position in which the pivotal constraint is in the free rotation mode and the selector cannot meet a first tooth of the two first teeth nor a second tooth of the two second teeth, a second position in which the pivotal constraint is in the locked rotation mode and the selector is blocked in the central notch, and a third position in which the first pivotal constraint is in said constrained rotation mode and the selector can meet only the two second teeth.

2. The cleaning device, according to claim 1, wherein $\tilde{\alpha}$=90°.

3. The cleaning device, according to claim 1, wherein $\tilde{\alpha}$=60°.

4. The cleaning device, according to claim 1, wherein the first teeth are shorter in a radial direction from a center of the crown than the second teeth.

5. The cleaning device, according to claim 4, wherein said translation is carried out in a radial direction with respect to the center of said crown and wherein:

in said first position said selector is at a maximum distance $d_{max}$ with respect to the center of said crown;

in said second position, said selector is at a minimum distance $d_{min}$ with respect to the center of said crown;

in said third position, said selector is at an intermediate distance $d_{med}$ with respect to the center of said crown.

6. The cleaning device, according to claim 4, wherein said translation is carried out in an axial direction with respect to the center of said crown.

7. The cleaning device, according to claim 4, wherein said translation is carried out both in a radial direction and in an axial direction with respect to the center of said crown.

8. The cleaning device, according to claim 1, wherein a second selection mechanism is also provided and arranged to make said second pivotal constraint pass between:

a free rotation mode, wherein said handle and said cleaning body can rotate freely with respect to each other with respect to said second rotation axis y;

a locked rotation mode, wherein said handle and said cleaning body cannot rotate with respect to each other with respect to said second rotation axis y.

9. A cleaning device comprising a handle graspable by a user and supporting a cleaning body arranged to wipe a surface, the handle comprising a longitudinal axis z, a distal end on which the cleaning body is supported, and a proximal end positioned opposite the distal end along the longitudinal axis z, said cleaning body comprising a blade arranged to be in contact with said surface on a cleaning plane $\pi$, the cleaning plane $\pi$ passing through a distal end of the blade and through the distal end of the handle, wherein the cleaning device further comprises:

a first pivotal constraint arranged to allow a relative rotation $\alpha$ between said handle and said cleaning body about a first rotation axis x orthogonal to said cleaning plane $\pi$;

a second pivotal constraint arranged to allow a relative rotation $\beta$ between said handle and said cleaning body about a second rotation axis y parallel to said cleaning plane $\pi$;

a first selection mechanism configured to alternatively arrange said first pivotal constraint in a free rotation mode, wherein said handle and said cleaning body can rotate freely with respect to each other with respect to said first rotation axis x, and in a locked rotation mode, wherein said handle and said cleaning body cannot rotate with respect to each other with respect to said first rotation axis x; said first selection mechanism is also configured to arrange said first pivotal constraint in a constrained rotation mode, wherein said relative rotation $\alpha$ has a maximum value equal to a first predetermined value a in the free rotation mode and equal to a second predetermined value in the constrained rotation mode, the second predetermined value being smaller than the first predetermined value, wherein said first selection mechanism comprises a crown and a selector, the crown having has at least two first teeth and at least two second teeth, the first teeth being shorter in a radial direction from a center of the crown than the second teeth, and wherein the crown and the selector are arranged for carrying out a translation to switch between three different positions:

a first position in which during said relative rotation $\alpha$ the selector cannot meet a second tooth of the at least two second teeth nor a first tooth of the at least two first teeth and said first pivotal constraint is in said free rotation mode;

a second position in which the selector is blocked between two of the at least two first teeth or between a first tooth of the at least two first teeth and a second tooth of the at least two second teeth and said first pivotal constraint is in said locked rotation mode; and a third position in which during said relative rotation $\alpha$ the selector can meet only said two second teeth and said first pivotal constraint is in said constrained rotation mode.

* * * * *